March 7, 1961 H. KLAUE 2,973,836
AIR-COOLED DISC BRAKE
Filed May 20, 1958
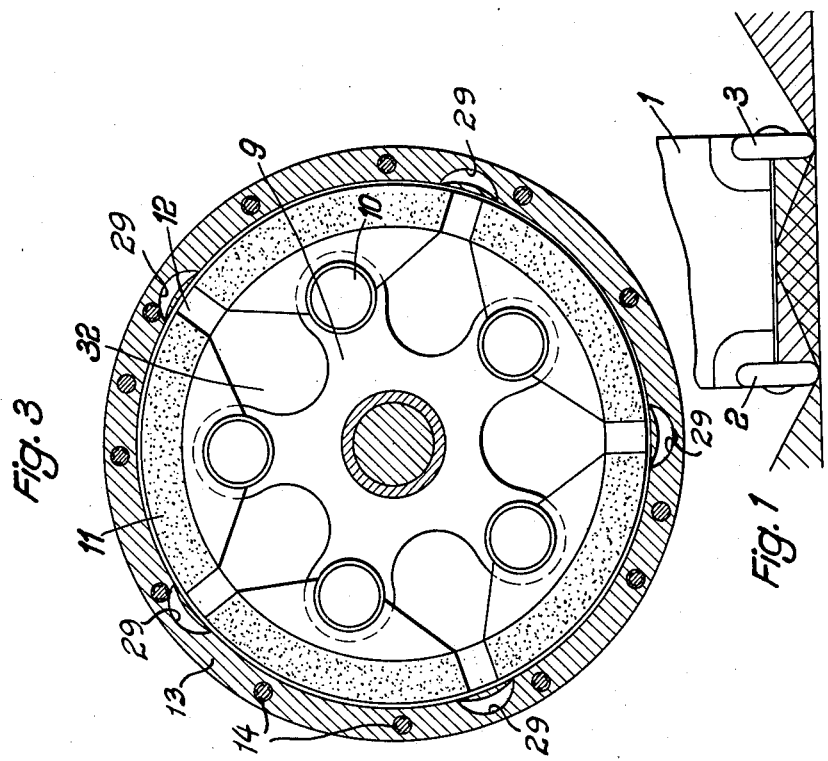
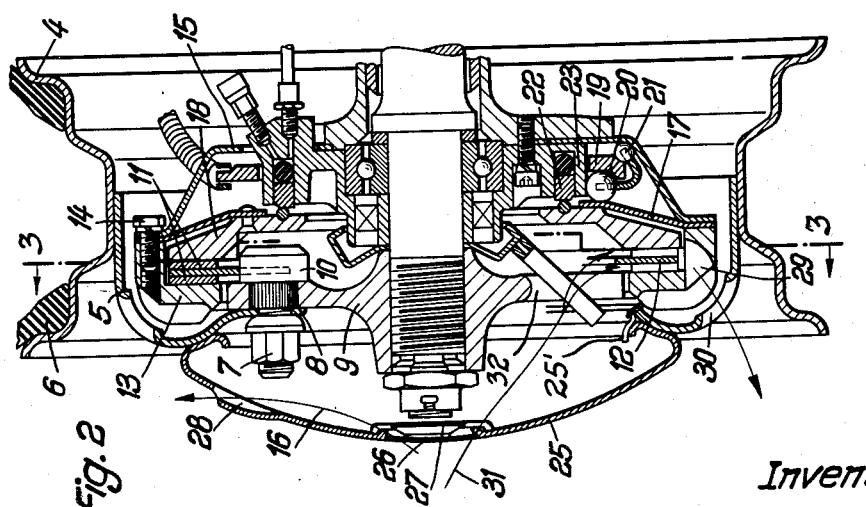
Inventor:
Hermann Klaue,
By
His Attorney.

United States Patent Office 2,973,836
Patented Mar. 7, 1961

2,973,836

AIR-COOLED DISC BRAKE

Hermann Klaue, Uberlingen, Bodensee, Germany
(Rue du Lac 10, Montreux-Clarens, Switzerland)

Filed May 20, 1958, Ser. No. 736,575

Claims priority, application Germany May 21, 1957

3 Claims. (Cl. 188—72)

This invention relates to a disc brake having brake discs which are mounted in a brake housing immovable in the circumferential direction and are secured for axial displacement on a rotating shaft, and which are provided with brake lining and urged against the brake housing during the braking operation. The disc brakes are constructed in such a manner that during rotation they draw in a current of cooling air at their inner periphery which air leaves the brake housing again through recesses provided at the outer circumference thereof.

It is the object of the invention to improve the disc brakes of the above-mentioned type from the heat point of view, by rapid and effective withdrawal of the brake heat from the brake lining segments. In this manner the life of the brakes should be increased.

The solution of this problem according to the invention consists in that the lining segments forming the brake lining of the brake discs are secured to the brake discs consisting of steel plate or bronze at such a distance apart that, during the rotation of the brake discs, they can exert a fan-like action on the cooling air which is drawn in from the outside of the vehicle wheels through a central recess in the hub-cap placed over the wheel disc surrounding the brake housing and recesses in the hub carrying the brake discs.

In the vicinity of its outer periphery, the hub-cap is provided with recesses which are arranged radially and through which any particles of dirt which may have penetrated into the hub-cap are slung out again. The central recess in the hub-cap for the entry of the cooling air is covered by a cap portion which, in known manner, is arranged offset in relation to the wheel hub, preferably being flanged on, in such a manner that radial apertures for the passage of the cooling air are left free at the outer periphery of said cap portion.

Figure 1 illustrates diagrammatically how, particularly when the road is wet, the under side of the motor vehicle also the inner faces of the wheels are exposed to dirt. If the car body 1 indicated diagrammatically with its wheels 2 and 3 travels over a dirty carriageway, then a spraying action occurs at a specific angle. The scattering of dirt by each wheel is indicated by hatching in the appropriate direction of Figure 1.

From the diagrammatic illustration it will be seen that the entire space between the wheels is exposed to dirt whereas the outer faces of the wheels remain substantially clean. It is therefore advisable to draw in the air serving to cool the disc brakes from the hub-cap side and not to derive it from the space between the wheels. In order to prevent dirt which penetrates into the interior—for example as a result of other vehicles passing—from being able to reach the brakes, the hub-cap is constructed in the manner indicated above.

Figures 2 and 3 illustrate one embodiment by way of example.

Figure 2 shows the cross-section through the wheel axis of a front wheel of a motor vehicle equipped with the disc brake according to the invention.

Figure 3 represents a longitudinal section through the brake along the line 3—3 in Figure 2.

In Figure 2, the wheel rim is given the reference numeral 4. It is connected to the wheel disc 5 and carries the tire 6. The wheel is bolted to the studs 8 by means of the hub-nuts 7, the studs being fixed in the hub 9. The studs 8 comprise cylindrical extensions 10 which are directed towards the interior of the wheel and on which the brake disc 11 provided with brake lining is mounted for free axial movement.

The individual lining segments of the disc are secured to a metal plate 12 by adhesion, screwing, riveting or sintering on. The brake housing 13, which is provided with ribs, is bolted to the cover 15 of the brake housing by means of bolts 14.

The brake housing is preferably made of light metal. The cover 15 of the brake housing is rigidly connected to the stationary part of the vehicle. Secured between the brake housing 13 and the cover 15 is a cup spring 17 which is secured to the pressure plate 18 by means of screws or rivets. The cup spring 17 serves not only to transmit the braking force but also to restore the pressure plate 18 to the initial position after the termination of the braking operation.

In order to actuate the brake, the pressure plate 18 is displaced axially towards the brake disc 11 by means of an annular hydraulic piston 22 which is mounted in an annular stationary cylinder 23. As a result, the brake disc is gripped between the inner wall of the brake housing 13 and the pressure plate 18 and in this manner the hub 9 is braked. Since this brake-cutting device does not form part of the invention, it will not be explained in more detail. Mention may merely be made, in this connection, of the fact that in addition, a mechanical actuation of the brake may be effected by means of a brake-actuating ring 19 which can be turned by a Bowden wire against the action of a spring. Figure 2 shows that this ring 19 is arranged concentrically with the hydraulic or pneumatic actuating device 22, 23 and outside it. From the lower part of Figure 2 it can be seen that the ring 19 transmits the braking force to the pressure plate 18 through rows of balls 20 and 21. The latter are mounted in recesses provided with oblique ramps which are omitted from Figure 2 in order not to affect the clarity of the drawing.

The hub-cap 25 is placed on the wheel disc 5 removably, for instance by snap springs 25′, and comprises, at its inner diameter, a central recess 26 into which an insert 27 is flanged from the inside. The flanged tongues of the insert 27 provide recesses at the outer diameter through which the cooling air can flow in radially. Any particles of dirt entering in the course of this are slung out in the direction of the arrow 16 through recess 28 in the protective cap 25 and in this manner are prevented from reaching the brake.

As shown in Figure 3, the air serving to cool the brake penetrates through the recesses 32 in the hub 9 into the brake. From here it is conveyed through the brake in the manner already described by the fan-like construction of the disc, and out of the brake housing 13 through apertures 29 therein, and is forced out of the interior of the wheel through apertures 30 in the wheel disc 5. The arrow 31 shows the path of the cooling air through the wheel and brake.

I claim:

1. In an air-cooled disc brake, having a non-rotatable housing and a rotatable hub journalled in said housing for rotation about an axis and including a hub cap and a wheel, in combination, a disc adapted to be secured to the hub and extending at right angle to said axis and rotating with said hub and being movable axially relative to said hub and having near its outer periphery brake lining segments adjacent said housing, said brake lining segments being spaced apart from each other peripherally and defining radial spaces and thereby operable to act as a fan propelling air radially outwardly through said radial spaces between said segments, and brake means adapted to be secured to the housing and operable to engage said segments frictionally between said brake means and said housing to brake said hub, said hub cap having a central recess for the passing of air, said hub having a series of axial air passages in radial alignment with said radial spaces, said wheel having apertures, and said housing having openings adjacent the outer periphery of said segments bounded by curved surfaces terminating in registry with said apertures, whereby air may by said fan action be sucked from the exterior through said central recess and through said passages and be propelled outwardly through said radial spaces between said segments and be expelled to the exterior through said openings in the housing and the apertures of the wheel.

2. A disc brake as claimed in claim 1, characterized in that, in the vicinity of its outer periphery, the hub-cap comprises recesses which are arranged radially and through which particles of dirt which have penetrated into the hub-cap are slung out again.

3. In a disc brake, as claimed in claim 1, a cap member covering internally said central recess of said hub-cap and being offset from the recess towards the interior of the hub-cap and having radial apertures for the passage of the cooling air into the interior of the hub-cap.

References Cited in the file of this patent

UNITED STATES PATENTS

| | | |
|---|---|---|
| 2,262,709 | Lambert | Nov. 11, 1941 |
| 2,326,961 | McCune | Aug. 17, 1943 |
| 2,331,259 | Whitten | Oct. 5, 1943 |
| 2,646,862 | Dodge | July 28, 1953 |

FOREIGN PATENTS

| | | |
|---|---|---|
| 1,120,550 | France | Apr. 23, 1956 |